United States Patent Office 3,442,666
Patented May 6, 1969

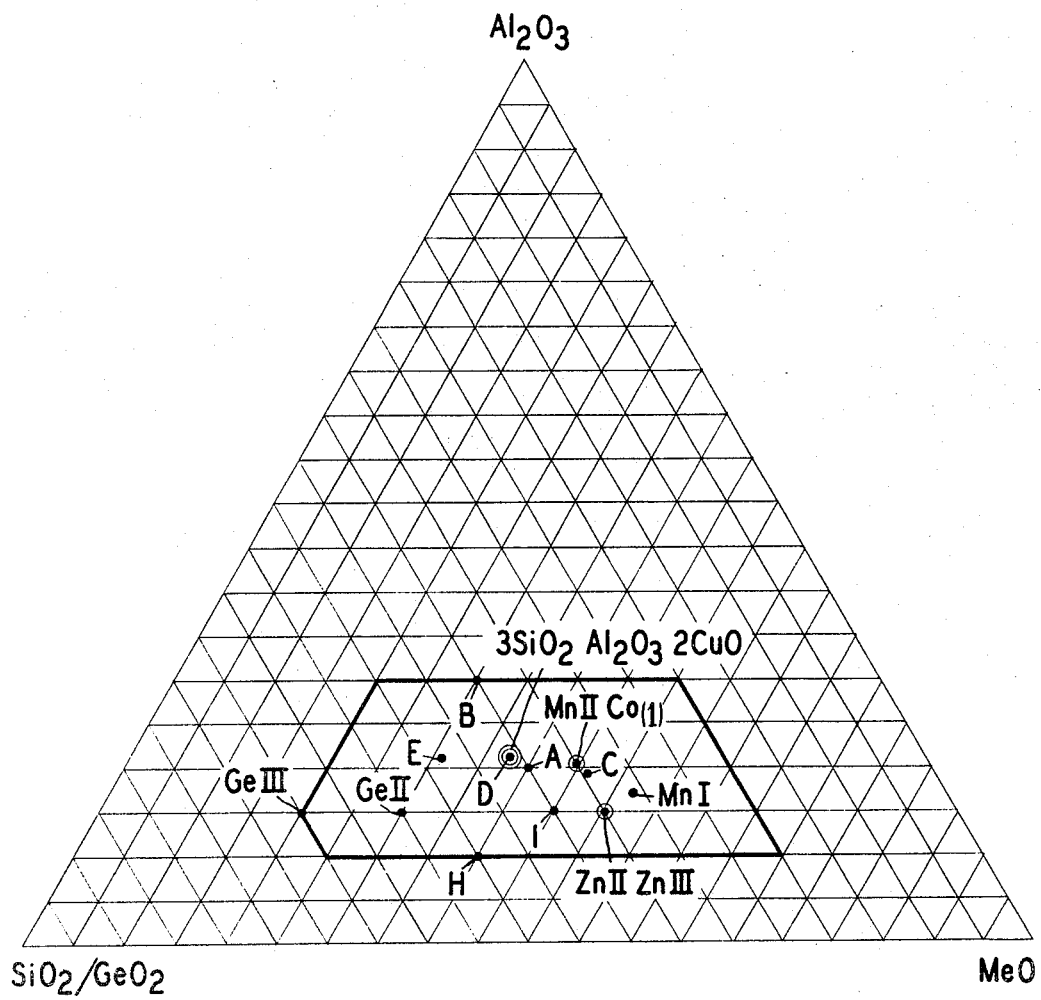

---

3,442,666
SOLID SOLUTION CEMENT
Aurel I. Berghezan, Brussels, Belgium, assignor to Union Carbide Corporation, a corporation of New York
Filed Nov. 29, 1963, Ser. No. 326,819
The portion of the term of the patent subsequent to Dec. 27, 1983, has been disclaimed
Int. Cl. C04b 35/14
U.S. Cl. 106—39                                5 Claims

ABSTRACT OF THE DISCLOSURE

A solid solution, at least ternary, is composed of $SiO_2$ or $GeO_2$ or both; $Al_2O_3$ and an oxide of at least one metal selected from the group consisting of Cu, Ag, Co, Mn, Zn, Ni and Fe in proportions represented by the formula $3SiO_2/GeO_2 \cdot Al_2O_3 \cdot 2MeO$.

---

This invention relates to a solid solution cement and refers more particularly to a homogeneous ternary system of a metal oxide, silica, and alumina.

In the course of research on metal ceramic compositions containing metals selected from the group copper, silver, cobalt, manganese, zinc, nickel, and iron with silica and alumina, which compositions are the subject of patent application, Ser. No. 326,764, now Patent 3,294,496, filed concurrently herewith, the present inventor observed that the binder phase or "cement" present in such compositions had properties which are of utility for a number of applications. This invention is based upon these observations and discoveries.

The accompanying drawing is a ternary diagram illustrating the composition of the cement of the invention.

The basic composition of the invention is a ternary solid solution of a metal oxide selected from the group consisting of the oxides of copper, silver, cobalt, manganese, zinc, nickel, and iron; silica or germania; and alumina. For conciseness the invention will be discussed in detail with reference to the system $3SiO_2 \cdot Al_2O_3 \cdot 2CuO$, but it will be understood that the other metal oxides may be substituted in whole or in part for copper oxide and that germania can be substituted in whole or in part for silica, the principal effect of such substitution being changes in the melting point of the composition. In the drawing the expression "MeO" is used indicative of the metal oxide constituent of the composition, and "$SiO_2/GeO_2$"

indicative of the silica and/or germania constituent.

The basic composition of the invention may be represented by the formula: $3SiO_2 \cdot Al_2O_3 \cdot 2CuO$. By weight this composition contains about 41.5% silica, 36.2% copper oxide (cupric oxide) and 22.5% alumina. This composition may be prepared simply by mixing the powdered oxides and melting the mixture. Its melting point is below about 1350° C. Melting may be accomplished in air in an ordinary furnace. The molten composition may be cast into any suitable mold and when solidified is found to be a homogeneous, solid solution similar to a glass.

The basic composition may be altered simply by adding an excess of one or more of the constituents to the melt. On solidification, the excess material is finely and substantially uniformly dispersed throughout a matrix of the cement.

A number of examples of the composition of the invention are set forth in the following table and are indicated on the ternary diagram of the drawing. These materials were prepared in the manner described above; by mixing powdered constituents, melting the mixture, and casting the melt into a mold. In some cases the mold was copper, and it was observed that the solidified material adhered strongly to the copper.

| Example | Composition | Micro hardness, kg./mm.² | Structure |
|---|---|---|---|
| B | 40% $SiO_2$; 30% $Al_2O_3$; 30% CuO. | 580 | Excess CuO+ $Al_2O_3$ in matrix of cement. |
| A | 40% $SiO_2$; 20% $Al_2O_3$; 40% CuO. | 410 | Homogeneous. |
| C | 34.6% $SiO_2$; 19.6% $Al_2O_3$; 45.8% CuO. | | Excess CuO. |
| D | 41.5% $SiO_2$; 22.3% $Al_2O_3$; 36.2% CuO. | 540 | Homogeneous. |
| G | 35% $SiO_2$; 15% $Al_2O_3$; 50% CuO. | | Excess CuO. |
| E | 49% $SiO_2$; 20% $Al_2O_3$; 31% CuO. | | |
| H | 50% $SiO_2$; 10% $Al_2O_3$; 40% CuO. | | Excess $SiO_2$+ Excess CuO. |
| I | 40% $SiO_2$; 15% $Al_2O_3$; 45% CuO. | | $SiO_2$+CuO in excess. |
| M | 32% $SiO_2$; 27% $Al_2O_3$; 41% CuO. | 700 | Excess $Al_2O_3$. |
| GeII | 55% $GeO_2$; 15% $Al_2O_3$; 30% CuO. | | |
| GeIII | 65% $GeO_2$; 15% $Al_2O_3$; 20% CuO. | | |
| MnI | 33.2% $SiO_2$; 18.6% $Al_2O_3$; 48.2$MnO_2$. | 570 | Excess $MnO_2$. |
| MnII | 35% $SiO_2$; 20% $Al_2O_3$; 20% $MnO_2$; 25% $Cu_2O$. | 560 | Nearly homogeneous, solid solution. |
| Co(I) | 34.8% $SiO_2$; 19.75% $Al_2O_3$; 30.81% CuO, 14.7% CoO. | | Excess of cobalt oxide. |
| ZnIII | 35% $SiO_2$; 15% $Al_2O_3$; 20% $Cu_2O$, 30% ZnO. | | |
| ZnII | 35% $SiO_2$; 15% $Al_2O_3$; 30% CuO, 20% ZnO. | 690 | |

The compositions listed in the foregoing table were obtained by preparing melts at temperatures not above about 1350° C. The excess materials distributed in the matrix of solid solution were, in most cases at least, never dissolved. It is possible to obtain a more uniform distribution of crystalline material by heating the melts to higher temperatures and then cooling them slowly to room temperature. Such treatment tends to cause solution of a greater proportion of some constituents for example alumina than can be dissolved at low temperatures. Slow cooling then tends to cause precipitation of such constituents as fine crystals uniformly distributed in the matrix.

The compositions of the invention are hard, generally having a hardness of about 6.5 to 7 on Moh's scale of hardness. Specific microhardness values are shown in the table. The materials are glassy and opaque. If excess copper oxide is present the material shows reddish coloration in random distribution in a black matrix. Certain compositions resemble black onyx, and other natural gem stones. The compositions are resistant to oxidation and possess good thermal shock resistance. They may, if desired, be crushed, re-melted, and solidified. The molten material wets and bonds to ceramic material, glasses, and metals having similar coefficients of thermal expansion.

By reason of the properties mentioned the composition has a variety of uses. It may be applied to metals to provide a protective oxidation resistant coating thereon. It may be used to infiltrate sintered ceramic materials such as alumina to render them substantially less porous. Because of its attractive color it may find use for decorative purposes and may be cast into patterns for use as costume jewelry, and may be drawn into filaments.

What is claimed is:

1. A composition of matter having a matrix consisting essentially of an at least ternary solid solution having the molar composition defined by the formula $$3SiO_2/GeO_2 \cdot Al_2O_3 \cdot 2MeO$$

wherein "MeO" is at least one oxide of at least one metal selected from the group consisting of copper, silver, cobalt, zinc, manganese, nickel, and iron; "$SiO_2/GeO_2$" is at least one oxide selected from the group consisting of silica and germania; and "$Al_2O_3$" is alumina; the proportions of such constituents being within the generally trapezoidal area of the ternary diagram of the drawing.

2. A composite article having a metal substrate and a coating thereon composed of the material defined by claim 1.

3. A filament composed of the composition defined by claim 1.

4. A composition as defined by claim 1 having the formula $3SiO_2 \cdot Al_2O_3 \cdot 2CuO$.

5. A composition of matter as defined in claim 1 in which at least one of said constituents is present in excess of the amount called for by said formula, said excess being randomly distributed in said matrix of solid solution.

References Cited

UNITED STATES PATENTS

| | | | |
|---|---|---|---|
| 2,544,060 | 3/1951 | Amberg et al. | 106—65 |
| 2,920,971 | 1/1960 | Stookey | 106—39 |
| 2,971,853 | 2/1961 | Stookey | 106—39 |
| 3,081,179 | 3/1963 | Charvat | 106—52 |
| 3,093,598 | 6/1963 | McMillan et al. | 106—52 |
| 3,282,711 | 11/1966 | Lin | 106—39 |
| 2,720,471 | 10/1955 | Suchet et al. | 117—125 |
| 3,249,460 | 5/1966 | Gerry | 117—70 |
| 3,294,496 | 12/1966 | Berghezan | 106—65 |

OTHER REFERENCES

Gaertner: "A Means of Producing Copper—Copper Oxide Rectifiers," Ceramic Bull. vol. 30 (1951) pp. 265–6.

Searle: Refractory Materials, 1950 3rd ed., pub. London, Charles Griffin & Co., pp. 184–185.

HELEN M. McCARTHY, *Primary Examiner.*

U.S. Cl. X.R.

29—182.5; 106—42, 65; 117—129